(12) United States Patent
Yamamoto et al.

(10) Patent No.: US 9,789,897 B2
(45) Date of Patent: Oct. 17, 2017

(54) STEERING APPARATUS

(71) Applicant: YAMADA MANUFACTURING CO., LTD., Kiryu-shi (JP)

(72) Inventors: Katsuya Yamamoto, Kiryu (JP); Takuya Aiba, Kiryu (JP); Tatsuya Abe, Kiryu (JP)

(73) Assignee: YAMADA MANUFACTURING CO., LTD., Kiryu-Shi, Gunma (JP)

( * ) Notice: Subject to any disclaimer, the term of this patent is extended or adjusted under 35 U.S.C. 154(b) by 0 days.

(21) Appl. No.: 15/231,508

(22) Filed: Aug. 8, 2016

(65) Prior Publication Data
US 2017/0043803 A1   Feb. 16, 2017

(30) Foreign Application Priority Data

Aug. 11, 2015 (JP) .................................. 2015-158911
Jul. 7, 2016 (JP) .................................. 2016-135427

(51) Int. Cl.
*B62D 1/184* (2006.01)
*B62D 1/185* (2006.01)
*B62D 1/19* (2006.01)

(52) U.S. Cl.
CPC .............. *B62D 1/192* (2013.01); *B62D 1/184* (2013.01); *B62D 1/185* (2013.01); *B62D 1/195* (2013.01)

(58) Field of Classification Search
CPC .......... B62D 1/184; B62D 1/185; B62D 1/19; B62D 1/192; B62D 1/195
See application file for complete search history.

(56) References Cited

U.S. PATENT DOCUMENTS

| 5,476,284 A * | 12/1995 | DuRocher | F16F 7/125 188/371 |
| 5,769,455 A * | 6/1998 | Duval | B62D 1/195 280/777 |
| 6,378,903 B1 * | 4/2002 | Yabutsuka | B62D 1/195 188/371 |

(Continued)

FOREIGN PATENT DOCUMENTS

| JP | GB 2365826 A * | 2/2002 | ............. B62D 1/195 |
| JP | 2002-337699 A | 11/2002 | |

(Continued)

*Primary Examiner* — Laura Freedman
(74) *Attorney, Agent, or Firm* — McGinn Law Group, PLLC

(57) ABSTRACT

A steering apparatus includes a column pipe, an outer column, a fixed bracket, a stopper bracket, and a clamping tool. The stopper bracket has a first suspending planar portion and a second suspending planar portion. A telescopic slot and an impact absorbing slot are formed in the first and second suspending planar portions. A first collapsing portion, which is configured as a protruding plate piece positioned between the telescopic slot and the impact absorbing slot of the first suspending planar portion and bent by colliding with a bolt shaft in an event of a secondary collision, is provided in the first and second suspending planar portions. A second collapsing portion, the height dimension of which decreases toward a trailing end is provided in the impact absorbing slot of one of the first suspending planar portion and the second suspending planar portion.

9 Claims, 11 Drawing Sheets

(56) References Cited

U.S. PATENT DOCUMENTS

| | | | | |
|---|---|---|---|---|
| 6,659,504 B2* | 12/2003 | Riefe | ............... | B62D 1/195 |
| | | | | 280/775 |
| 7,401,814 B2* | 7/2008 | Yasuhara | ............... | B62D 1/195 |
| | | | | 280/775 |
| 7,559,577 B2* | 7/2009 | Oh | ............... | B62D 1/195 |
| | | | | 280/777 |
| 7,703,804 B2* | 4/2010 | Cymbal | ............... | B62D 1/184 |
| | | | | 280/775 |
| 7,726,691 B2* | 6/2010 | Yamada | ............... | B62D 1/184 |
| | | | | 280/775 |
| 8,123,251 B2* | 2/2012 | Olgren | ............... | B62D 1/184 |
| | | | | 280/775 |
| 8,522,639 B2* | 9/2013 | Hirooka | ............... | B62D 1/184 |
| | | | | 280/775 |
| 8,539,855 B2* | 9/2013 | Schnitzer | ............... | B62D 1/184 |
| | | | | 280/775 |
| 8,899,128 B2* | 12/2014 | Maniwa | ............... | B62D 1/184 |
| | | | | 280/775 |
| 9,187,116 B2* | 11/2015 | Yokota | ............... | B62D 1/192 |
| 9,365,234 B2* | 6/2016 | Moriyama | ............... | B21D 26/033 |
| 9,540,031 B2* | 1/2017 | Tagaya | ............... | B62D 1/184 |
| 2005/0173914 A1* | 8/2005 | Sadakata | ............... | B62D 1/181 |
| | | | | 280/777 |
| 2007/0068311 A1* | 3/2007 | Shimoda | ............... | B62D 1/195 |
| | | | | 74/493 |

FOREIGN PATENT DOCUMENTS

| | | | |
|---|---|---|---|
| JP | 2004-082758 A | | 3/2004 |
| JP | 2004090908 A | * | 3/2004 |
| JP | 2004161242 A | * | 6/2004 |
| JP | 2012180038 A | * | 9/2012 |
| JP | 2012180039 A | * | 9/2012 |

* cited by examiner

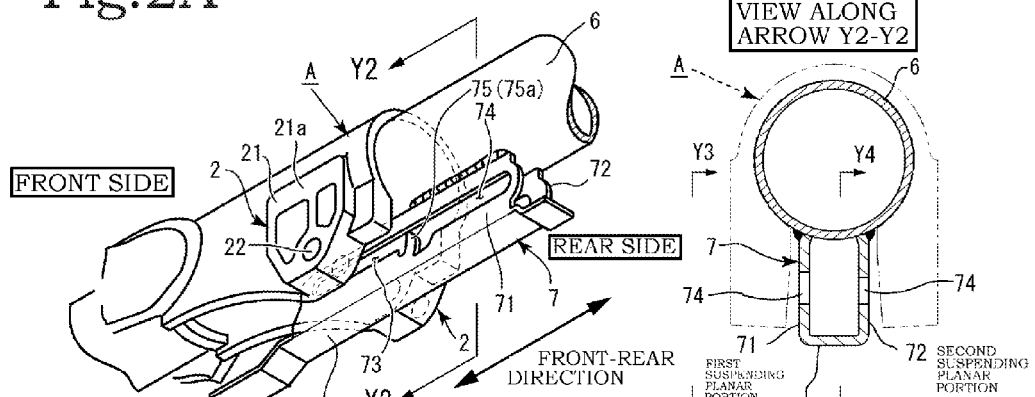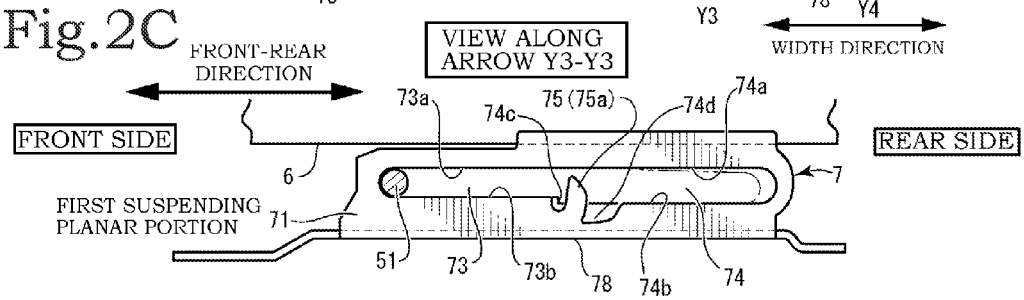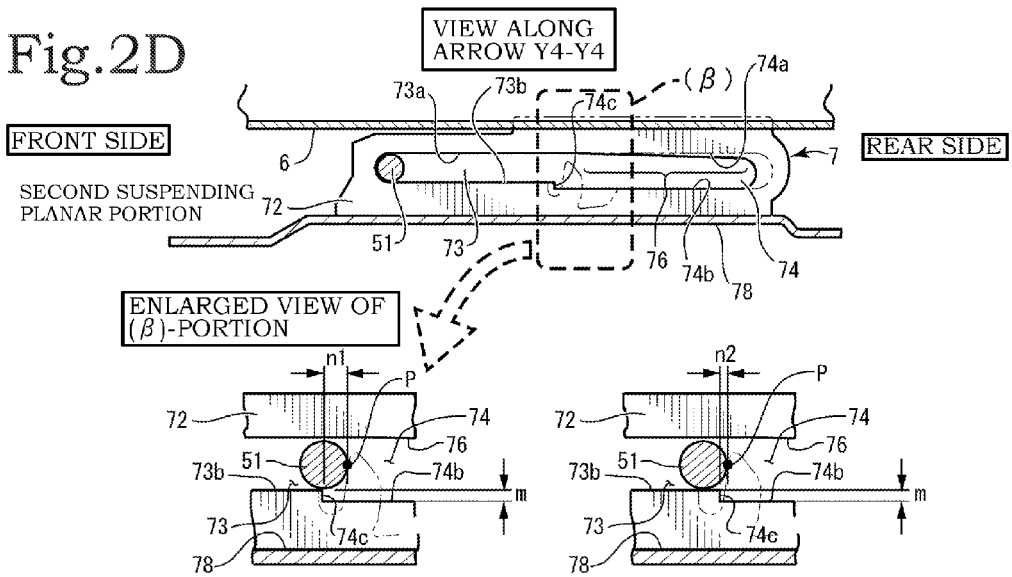

STEERING APPARATUS

BACKGROUND OF THE INVENTION

1. Field of the Invention

The present invention relates to a steering apparatus which includes a telescopic adjustment mechanism and an impact absorbing mechanism for absorbing impact in the event of a secondary collision, and in which these mechanisms can be shared by the same member, and moreover which can smoothly move from a telescopic adjustment region to an impact absorbing region when the steering apparatus contracts toward a front side in the event of a secondary collision.

2. Description of the Related Art

Conventionally, various steering apparatuses which include a telescopic adjustment mechanism and an impact absorbing mechanism for protecting a driver in the event of a secondary collision when a collision accident occurs are known. According to an example of a common structure of this type of steering apparatuses, a column moves along an axial slot while resisting against the pressing force of a bolt shaft in the event of a secondary collision.

Moreover, a type of steering apparatuses having a structure in which a width of an axial line is formed smaller than the diameter of a bolt shaft so that, when a predetermined load is applied, the column moves in a state in which the edge of the axial slot is collapsed by the bolt shaft is often used. An example of such a conventional technique as illustrated above is disclosed in Japanese Patent Application Laid-open No. 2002-337699. Hereinafter, Japanese Patent Application Laid-open No. 2002-337699 will be described briefly.

In this description, the reference numerals used in Japanese Patent Application Laid-open No. 2002-337699 are used as they are. However, in order to distinguish from the description of the present invention, the reference numerals are surrounded by parentheses in the description of Japanese Patent Application Laid-open No. 2002-337699. A steering apparatus disclosed in Japanese Patent Application Laid-open No. 2002-337699 has a second upper bracket (22) having an upper end welded to a column (2), and the second upper bracket (22) moves together with the column (2) in relation to a vehicle body when the column (2) moves in relation to the vehicle body due to an impact.

Moreover, the second upper bracket (22) is sandwiched between both side walls (21a and 21b) of a first upper bracket (21) fixed to the vehicle body so as to be slidable in relation to each other. Screw shafts (51) with heads (51') having cores extending in a lateral direction are inserted into first through-holes (41) formed in both side walls (21a and 21b) of the first upper bracket (21) and second through-holes (42) formed in both side walls (22a and 22b) of the second upper bracket (22). The screw shaft (51) has a nut (54) that crews into the screw shaft (51) with a washer (52) interposed therebetween and a lever (53) that is integrated with the nut (54). A short diameter of an impact absorbing region (42) is set to be smaller than the largest outer diameter of the shaft (51) in a direction orthogonal to the relative moving direction. The shaft (51) presses and expands an impact absorbing region (42a) whereby the impact is absorbed.

Moreover, Japanese Patent Application Laid-open No. 2004-82758 discloses a conventional technique by which the amount of collision energy absorbed by an energy absorbing mechanism in the event of a secondary collision increases when collapse progresses. A guide hole (79) formed in an inner column (13) includes a telescopic portion (111) having such a vertical width that a guide pin (75) of a guide bolt (53) is loosely fit into the guide hole (79) and a collapsing portion (113) which extends rearward from the telescopic portion (111) and of which the vertical width decreases gradually.

A range in which the guide pin (75) moves in a front-rear direction inside the telescopic portion (111) is a telescopic stroke (S1) and a range in which the guide pin (75) retracts inside the collapsing portion (113) is a collapse stroke (S2). Since the vertical width of the collapsing portion (113) gradually decreases rearward, an impact absorbing load in the event of a secondary collision of a driver increases along a quadratic curve as the collapse progresses.

SUMMARY OF THE INVENTION

In Japanese Patent Application Laid-open No. 2002-337699, when the lever is clamped, both the side walls (22a and 22b) of the second upper bracket (22) having the telescopic adjustment portion and the energy absorbing portion formed thereon come into pressure-contact with both side walls (21a and 21b) of the first upper bracket (21). That is, both the side walls (22a and 22b) of the second upper bracket (22) serve as frictional surfaces that make frictional contact with both the side walls (21a and 21b) of the first upper bracket (21). Due to this, it is necessary to take the frictional load of the frictional surface into consideration when setting the energy absorbing load, and it is difficult to set the energy absorbing load.

Furthermore, when an upper side of the impact absorbing region (42a) is deformed plastically, the deformed portion protrudes toward both the side walls (21a and 21b) of the first upper bracket (21) and a large load may occur. Moreover, an edge (42c) which is a lower side of the impact absorbing region (42a) and an edge (42d) which is a lower side of a shaft waiting region (42b) are continuous straightly, and the width dimension of the upper side of the impact absorbing region (42a) decreases.

Although energy is absorbed by allowing the upper side to be plastically deformed by the screw shaft (51), since the screw shaft (51) comes into contact with the edge (42d) and a load occurs, the impact absorbing region (42a) may be also deformed downward. Moreover, when the impact absorbing region (42a) is deformed, it may not be possible to obtain a desired energy absorbing load. Moreover, since the shaft waiting region (42b) and the impact absorbing region (42a) are formed continuously, when telescopic adjustment is performed strongly, the screw shaft (51) bits into the impact absorbing region (42a) and it may not be possible to perform telescopic adjustment.

In Japanese Patent Application Laid-open No. 2004-82758, the telescopic portion (111) and the collapsing portion (113) of the guide hole (79) are formed continuously. Thus, similarly to Japanese Patent Application Laid-open No. 2002-337699, the guide pin (75) may bite into the collapsing portion (113) during telescopic adjustment. Therefore, an object of the present invention is to provide a steering apparatus which includes a telescopic adjustment mechanism and an impact absorbing mechanism for absorbing impact in the event of a secondary collision, and in which these mechanisms can be shared by the same member, and which can smoothly move from a telescopic adjustment region to an impact absorbing region.

As a result of intensive studies to solve the above problems, the present inventor solved the problems by providing, as a first embodiment, a steering apparatus including: a column pipe; an outer column having a grasping portion that grasps the column pipe and clamping portions that allow the grasping portion to extend and contract in a radial direction; a fixed bracket having a fixed side portion that sandwiches both sides of the outer column in a width direction; a stopper bracket secured to the column pipe and disposed between both of the clamping portions; and a clamping tool having a bolt shaft that clamps and unclamps both of the clamping portions of the outer column, the stopper bracket, and the fixed bracket, the stopper bracket being configured to be separated from both of the clamping portions when the outer column is clamped by the clamping tool, wherein the stopper bracket has in the width direction thereof a first suspending planar portion and a second suspending planar portion on both sides; on the first and second suspending planar portions, a telescopic slot and an impact absorbing slot, in which the bolt shaft can be inserted, are formed extending from a front side toward a rear side in the first and second suspending planar portions, a first collapsing portion which is configured as a protruding plate piece positioned between the telescopic slot and the impact absorbing slot of the first suspending planar portion and bent when colliding with the bolt shaft in the event of a secondary collision is provided, and a second collapsing portion configured as an inclined side, the height dimension of which decreases toward a trailing end is provided in the impact absorbing slot of one of the first suspending planar portion and the second suspending planar portion.

A second embodiment solves the problems by providing the steering apparatus according to the first embodiment, in which the inclined side is formed on the upper side of the impact absorbing slot on the side of the second suspending planar portion. A third embodiment solves the problems by providing the steering apparatus according to the first embodiment, in which the inclined side is formed on the lower side of the impact absorbing slot on the side of the second suspending planar portion. A fourth embodiment solves the problems by providing the steering apparatus according to the first embodiment, in which the inclined side is formed on the upper side and the lower side of the impact absorbing slot on the side of the second suspending planar portion.

A fifth embodiment solves the problems by providing the steering apparatus according to the first embodiment, in which the inclined side is formed on the upper side of the impact absorbing slot on the side of the first suspending planar portion. A sixth embodiment solves the problems by providing the steering apparatus according to the first embodiment, in which the inclined side is formed on the lower side of the impact absorbing slot on the side of the first suspending planar portion. A seventh embodiment solves the problems by providing the steering apparatus according to the first embodiment, in which the inclined side is formed on the upper side and the lower side of the impact absorbing slot on the side of the first suspending planar portion.

An eighth embodiment solves the problems by providing the steering apparatus according to the first embodiment, in which a step is formed near a starting end of each of both impact absorbing slots, due to the step, a height dimension near the starting end of each of the impact absorbing slots is larger than a height dimension of each telescopic slot, and positions of respective steps are shifted in a front-back direction. A ninth embodiment solves the problems by providing the steering apparatus according to the first embodiment, in which the protruding plate piece of the first collapsing portion is formed to be inclined upward and downward from a lower side of the impact absorbing slot.

In the first to seventh embodiments of the present invention, the stopper bracket is separated from both clamping portions when the outer column is clamped by the clamping tool. Due to this, the load when the first collapsing portion is crushed by the bolt shaft, the load when the second collapsing portion is crushed, and a frictional load based on the telescopic holding force can be set individually. In addition to the frictional load, the load when the second collapsing portion configured as a protruding plate piece is pressed down by the bolt shaft and the squeezing load of the inclined side can be set individually. Thus, it is easy to design (set) an appropriate energy absorbing load.

The second collapsing portion configured as the inclined side, the height dimension of which gradually decreases (narrows) toward the trailing end is provided in the impact absorbing slot of one of the first and second suspending planar portions. Due to this, it is possible to gradually increase the latter-half load after the first collapsing portion is crushed by the bolt shaft.

BRIEF DESCRIPTION OF THE DRAWINGS

FIG. 2A is a perspective view of main parts of the present invention, FIG. 2B is an enlarged cross-sectional view of a partial portion of 2A, taken along arrow Y2-Y2 in FIG. 2A, FIG. 2C is an enlarged side view taken along arrow Y3-Y3 in FIG. 2B, FIG. 2D is an enlarged cross-sectional view taken along arrow Y4-Y4 in FIG. 2B, FIG. 2E is an enlarged view of a portion—(β)-portion—indicated by "(β)" in FIG. 2D, and FIG. 2F is an enlarged view of another embodiment of the (β)-portion in FIG. 2D;

DESCRIPTION OF THE PREFERRED EMBODIMENTS

Hereinafter, embodiments of the present invention will be described based on the drawings. Here, in the present invention, directions are represented by a front side and a rear side. The front side and the rear side are based on a front-rear direction of a vehicle in a state in which a steering apparatus according to the present invention is attached to the vehicle. Specifically, in respective constituent members of the steering apparatus, the side close to a front wheel of the vehicle is defined as the front side and the side close to a handle (steering wheel) 8 is defined as the rear side (see FIG. 1A).

Figure 1A:
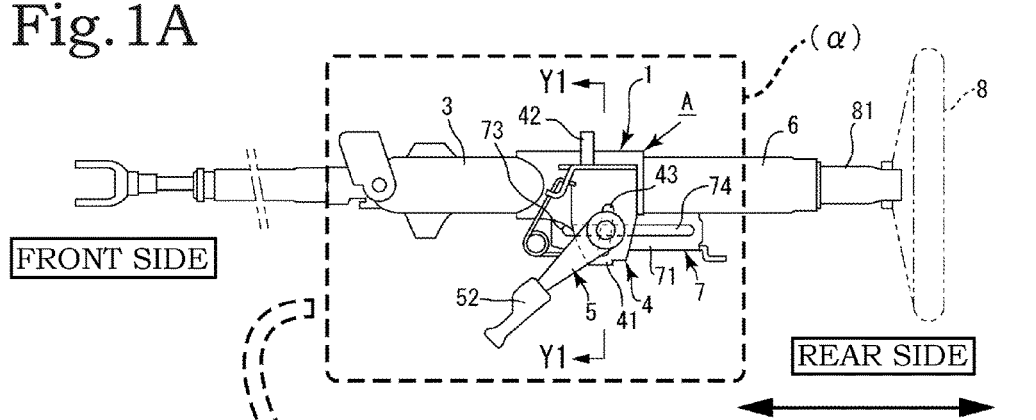
FIG. 1A is a side view of an embodiment of the present invention.
Figure 1B:
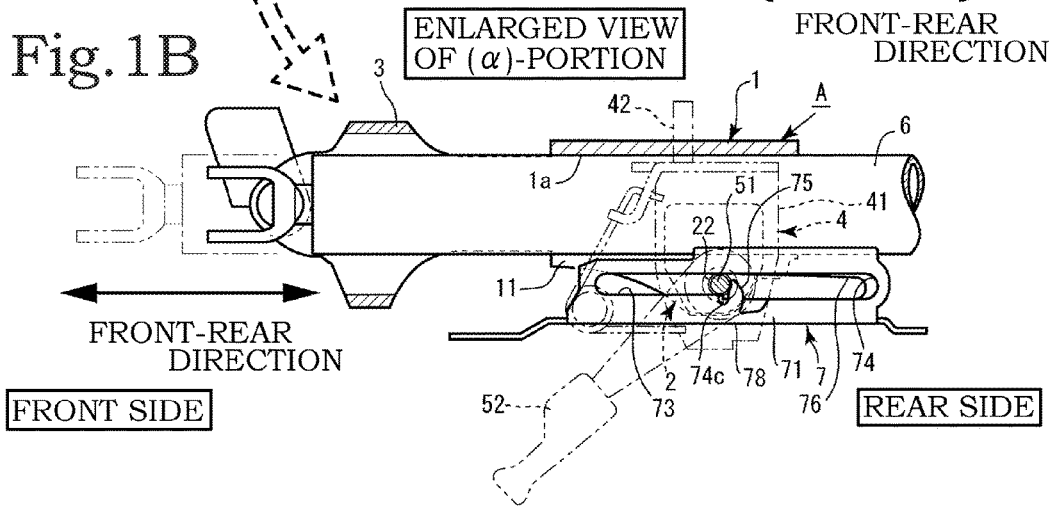
FIG. 1B is an enlarged partial cross-sectional view of a portion—(α)-portion—indicated by "(α)" in FIG. 1A.
Figure 1C:
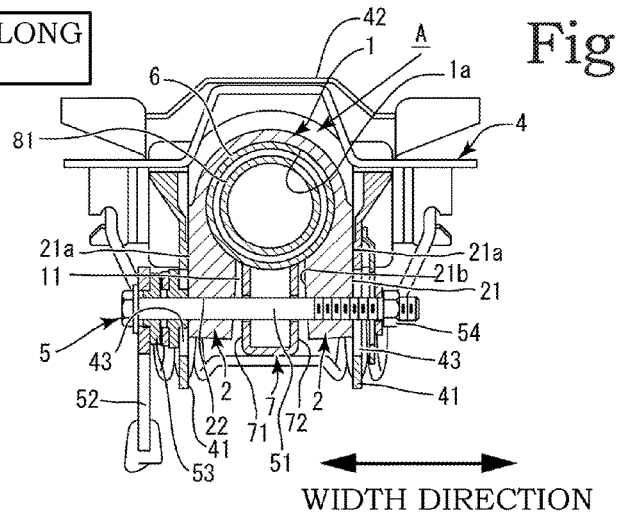
FIG. 1C is an enlarged cross-sectional view taken along arrow Y1-Y1 in FIG. 1A.
Figure 3A:
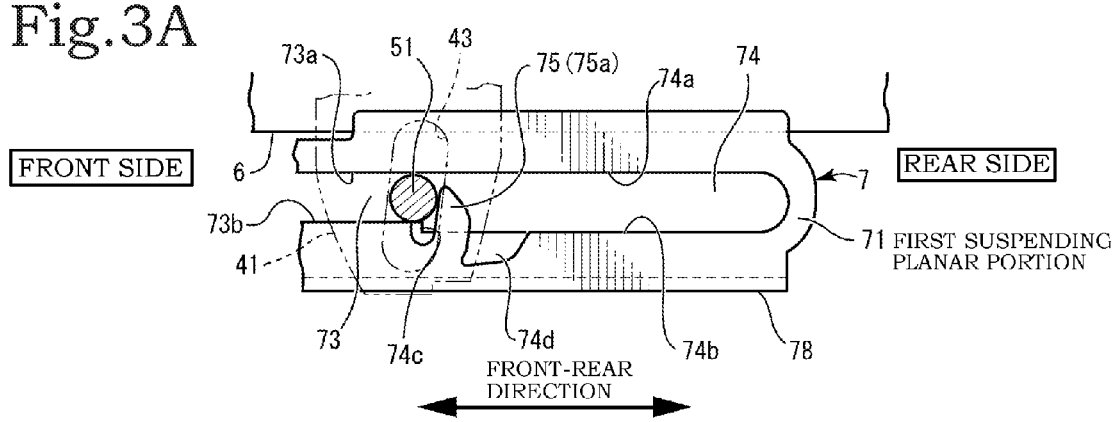
FIGS. 3A to 3D are enlarged partial cross-sectional views of main parts, illustrating a cycle in which a bolt shaft close to a first suspending planar portion collapses toward a first collapsing portion in the event of a secondary collision.
Figure 3B:
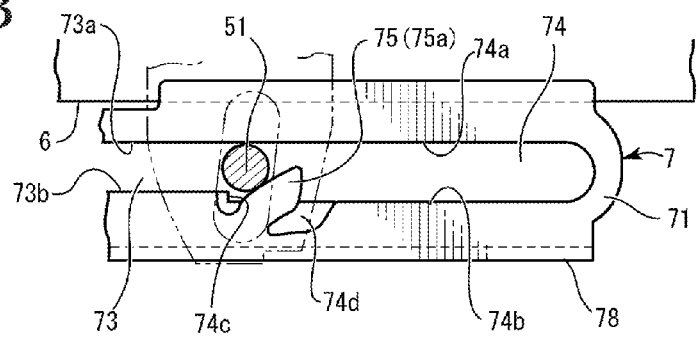
Figure 3C:
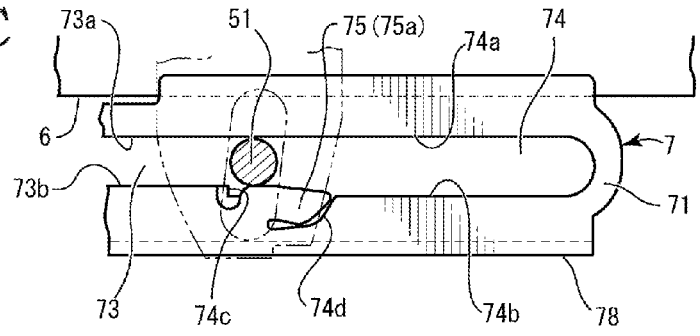
Figure 3D:
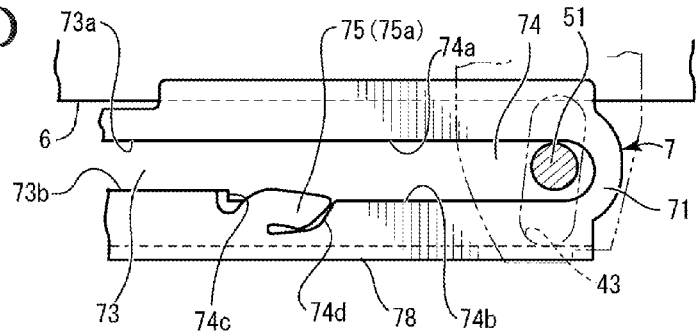
Figure 4A:
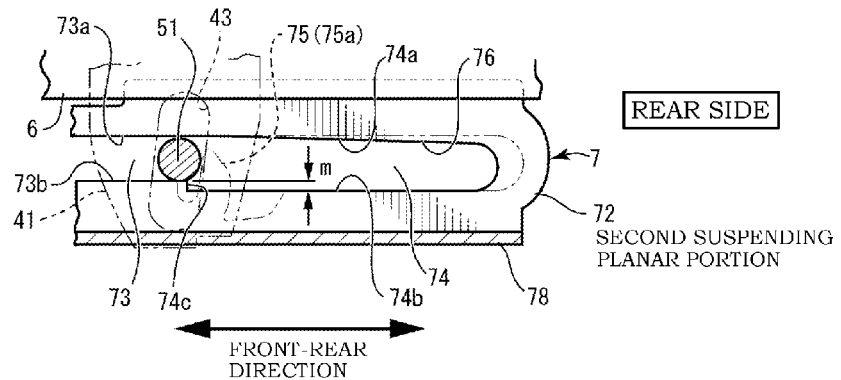
FIGS. 4A to 4D are enlarged partial cross-sectional views of main parts, illustrating a cycle in which a bolt shaft close to a second suspending planar portion collapses toward a second collapsing portion.
Figure 4B:
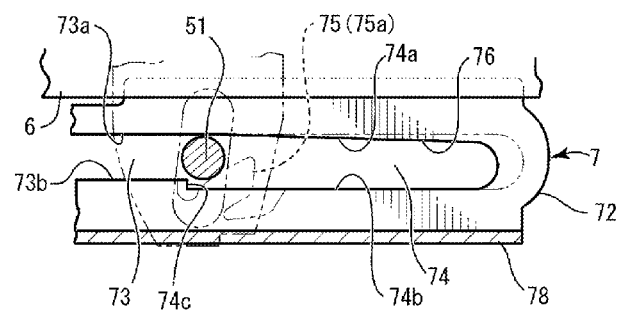
Figure 4C:
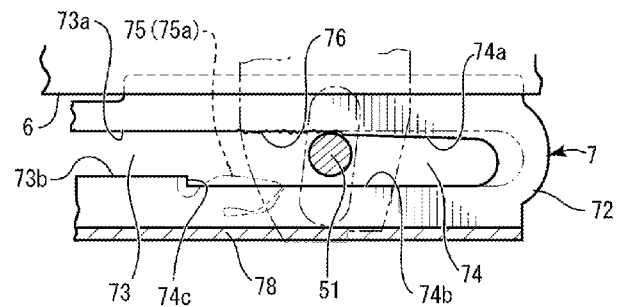
Figure 4D:
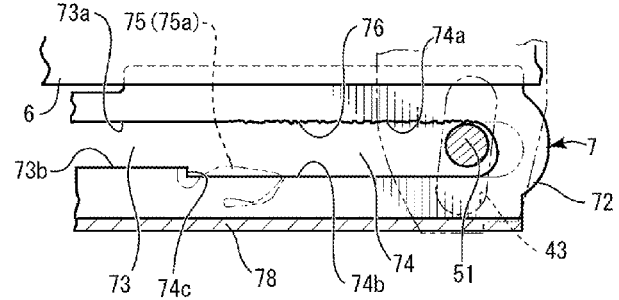

As illustrated in FIGS. 1A to 1C, main components of the present invention include an outer column A, a fixed bracket 4, a clamping tool 5, a column pipe 6, and a stopper bracket 7. Moreover, a handle shaft 81 is accommodated in the column pipe 6. The outer column A includes a grasping portion 1 and a clamping portion 2. The grasping portion 1 is formed in an approximately hollow cylindrical form. Specifically, the grasping portion 1 has a grasping inner circumferential surface 1a (see FIGS. 1B and 1C). A slit 11 is formed on a lower side in a radial direction of the grasping portion 1.

The slit 11 extends from the front side in an axial direction of the grasping portion 1 toward the rear side and is discontinuous in the width direction. Both edges facing each other in the width direction of the slit 11 approach each other. Thus, the diameter of the grasping inner circumferential surface 1a decreases. As a result, the column pipe 6 accommodated in and attached to the grasping portion 1 can be clamped and locked (fixed).

The diameter of the grasping inner circumferential surface 1a of the grasping portion 1 is slightly larger than the outer diameter of the column pipe 6 so that the column pipe 6 can slide easily in an unlocked state. Moreover, the grasping portion 1 has such a length that an approximately intermediate portion in the axial direction of the column pipe 6 can be supported appropriately in the axial direction. The column pipe 6 protrudes from the front and rear ends in the axial direction of the grasping portion 1.

Clamping portions 2 are integrally formed in a lower portion of the outer column A (see FIG. 1C). The clamping portions 2 have a bilaterally symmetrical shape and are integrally formed at both ends in the width direction of the slit 11. Specifically, the clamping portions 2 are thick planar portions that are formed approximately in such a form as to suspend from both ends in the width direction of the slit 11 or the vicinities thereof.

The clamping portion 2 has a vertical plate shape when seen from the front side in the axial direction of the grasping portion 1. Moreover, the clamping portion 2 has a block shape when seen from the rear side in the axial direction of the clamping portion 2 and has a thickness corresponding to the length between both ends in the horizontal radial direction of the grasping portion 1. Furthermore, on the rear side in the axial direction of the clamping portion 2, the width dimension may be slightly larger than the outer diameter of the grasping portion 1.

The outer surfaces of both clamping portions 2 will be referred to as an outer side surface 21a. Moreover, the opposing inner surfaces of both the clamping portions 2 will be referred to as an inner side surface 21b. The outer side surface 21a is a flat surface and is configured so that, in a state in which the clamping portions 2 are sandwiched between both fixed side portions 41 of the fixed bracket 4, the fixed side portion 41 can make contact with the outer side surface 21a of the connecting portion 21.

Clamping through-holes 22 are formed in both clamping portions 2 so as to extend in a direction orthogonal to the axial direction of the outer column A and in a direction parallel to the horizontal radial direction of the grasping portion 1. An arm portion 3 is formed on the front side in the front-rear direction of the grasping portion 1.

The fixed bracket 4 includes fixed side portions 41 formed on both sides in the width direction and an attachment apex portion 42. Adjustment holes 43 which are slots extending in an approximately up-down direction or a vertical direction are formed in both the fixed side portions 41 (see FIGS. 1A and 1C). The clamping tool 5 includes a bolt shaft 51, a locking lever portion 52, a clamping cam 53, and a nut 54 (see FIG. 1C).

The clamping tool 5 is attached to the locking lever portion 52 and the clamping cam 53 by the nut 54. An intermediate portion of the steering shaft is inserted into the column pipe 6, and the steering wheel (handle) 8 is attached to the distal end of the steering shaft protruding from the rear side of the column pipe 6.

The stopper bracket 7 includes a first suspending planar portion 71, a second suspending planar portion 72, and a bottom plate portion 78 (see FIGS. 1A to 1C, FIGS. 2A to 2F, and the like). The first and second suspending planar portions 71 and 72 extend in the axial direction of the column pipe 6 and are disposed in parallel to each other at a predetermined interval on the lower side in the radial direction of the column pipe 6. The upper ends of the first and second suspending planar portions 71 and 72 are secured to the column pipe 6 (see FIG. 1C and FIGS. 2A and 2B).

The bottom plate portion 78 is formed at the lower ends of the first and second suspending planar portions 71 and 72. Due to the first and second suspending planar portions 71 and 72 and the bottom plate portion 78, a cross-section orthogonal to the longitudinal direction has an approximately inverted gate shape or an angled U-shape (see FIG. 2B). A telescopic slot 73 and an impact absorbing slot 74 are formed in each of the first and second suspending planar portions 71 and 72 (see FIGS. 2A to 2D). The telescopic slot 73 is a portion used for telescopic adjustment, and the impact absorbing slot 74 is a portion used when a steering column moves toward the front side in the event of a secondary collision.

The height dimensions of the telescopic slots 73 formed in the first and second suspending planar portions 71 and 72 are larger than the diameter of the bolt shaft 51 so that the bolt shaft 51 can be inserted therein. More specifically, the bolt shaft 51 can be inserted into both telescopic slots 73 with a margin.

A first collapsing portion 75 which is formed between the telescopic slot 73 and the impact absorbing slot 74 with a step 74c interposed therebetween and which is formed as a protruding plate piece 75a that is bent by colliding with the bolt shaft 51 of the clamping tool 5 in the event of a secondary collision is provided in the first suspending planar portion 71 (see FIG. 2C). The first collapsing portion 75 configured as the protruding plate piece 75a has a shaft shape or a rod shape and is formed so as to protrude from one end side in the up-down direction (the direction orthogonal to the longitudinal direction) of the impact absorbing slot 74 toward the other end side. More specifically, the first collapsing portion 75 protrudes from the lower end side of the impact absorbing slot 74 toward the upper end side (see FIGS. 2A and 2C and the like).

Figure 11A:
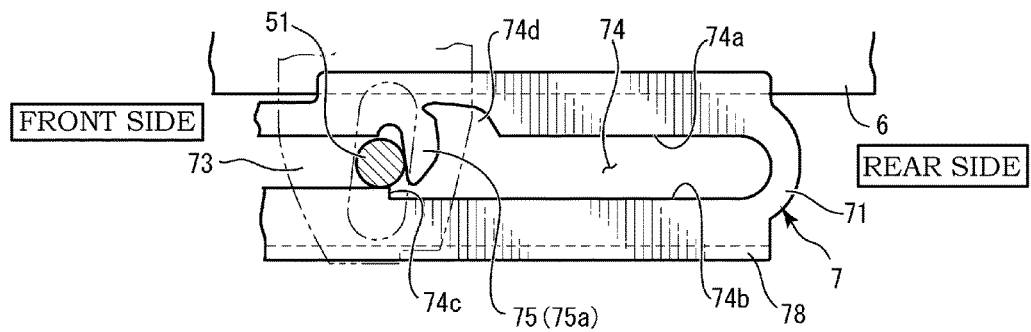
FIG. 11A is an enlarged view of main parts, illustrating another embodiment of the first collapsing portion.
Figure 11B:
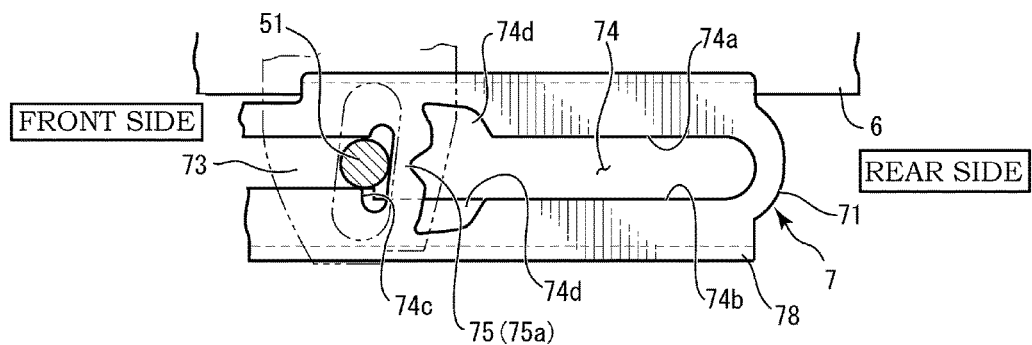
FIG. 11B is an enlarged view of main parts, illustrating still another embodiment of the first collapsing portion.

Alternatively, the first collapsing portion 75 may protrude from the upper end side of the impact absorbing slot 74 toward the lower end side (see FIG. 11A). Moreover, both ends in the longitudinal direction of the first collapsing portion 75 configured as the protruding plate piece 75a may be formed continuously from the lower end side of the impact absorbing slot 74 toward the upper end side (see FIG. 11B). The first collapsing portion 75 is preferably formed such that the protruding direction from the root portion thereof is inclined in the bending direction due to collision with the bolt shaft 51 in the event of a secondary collision (see FIG. 2C).

The first collapsing portion 75 collapses with pressing force during collision with the bolt shaft 51 in the event of a secondary collision. In the collapsed state, the first collapsing portion 75 configured as the protruding plate piece 75a falls down from the root portion thereof (see FIGS. 3A to 3D). That is, impact is absorbed when the bolt shaft 51 presses the first collapsing portion 75 down. Thus, a recess portion 74d that accommodates the first collapsing portion 75 when the first collapsing portion 75 falls down is formed on the rear side of a portion in which the first collapsing portion 75 of the impact absorbing slot 74 is formed.

The recess portion 74d has approximately the same shape as the shape of the first collapsing portion 75 being pressed down. When the first collapsing portion 75 falls down and is accommodated in the recess portion 74d, the portion near the front side of the impact absorbing slot 74 has an approximately flat shape and the bolt shaft 51 can smoothly move up to the end on the rear side of the impact absorbing slot 74. A protrusion length of the first collapsing portion 75 is approximately between ½ and ⅘ of the vertical width of the first collapsing portion 75.

The height dimensions of the impact absorbing slot 74 in which the first collapsing portion 75 is provided is larger than the height dimension of the telescopic slot 73 due to the step 74c. Thus, a lower side 74b of the impact absorbing slot 74 is configured such that, after the first collapsing portion 75 is pressed down by the bolt shaft 51 and is accommodated in the recess portion 74d, the lower side 74b is located at a position lower than a lower side 73b of the telescopic slot 73 (see FIGS. 4A to 4D).

Next, the second collapsing portion 76 will be described. First to sixth embodiments are provided as embodiments of the second collapsing portion 76 (see FIGS. 5 to 10). The first to third embodiments are embodiments in which the second collapsing portion 76 is formed in the impact absorbing slot 74 of the second suspending planar portion 72 (see FIGS. 5 to 7). Moreover, the fourth to sixth embodiments are embodiments in which the second collapsing portion 76 is formed in the impact absorbing slot 74 of the first suspending planar portion 71 (see FIGS. 8 to 10).

Hereinafter, the first embodiment of the second collapsing portion 76 will be described with reference to FIGS. 1A to 1C to FIG. 5. The second to sixth embodiments will be described at the end. In the first embodiment, the second collapsing portion 76 is formed on an upper side 74a of the impact absorbing slot 74 of the second suspending planar portion 72 (see FIG. 2D, FIGS. 4A to 4D, and FIG. 5). The second collapsing portion 76 is formed such that the dimension in the direction of height of the impact absorbing slot 74 gradually decreases (narrows) from the starting end toward the trailing end (from the front side toward the rear side) of the impact absorbing slot 74.

That is, the upper side 74a formed in an inclined form as the second collapsing portion 76 approaches the lower side 74b from the starting end toward the trailing end (from the front side toward the rear side) of the impact absorbing slot 74. Specifically, the second collapsing portion 76 configured as an inclined side is inclined downward by an angle θ about a reference straight line extending in the axial direction of the column pipe 6 on the upper side 74a.

Here, the lower side 74b of the impact absorbing slot 74 on which the second collapsing portion 76 is not formed is parallel (or approximately parallel) to the axial direction of the column pipe 6. The second collapsing portion 76 configured as the inclined side is formed so as to extend from the starting end which is set at the same position or approximately the same position as the formation position of the first collapsing portion 75 of the first suspending planar portion 71 toward the rear side of the stopper bracket 7.

The starting end of the second collapsing portion 76 is set to be located on the rear side in relation to a position at which the bolt shaft 51 of the clamping tool 5 comes into contact with the first collapsing portion 75 configured as the protruding plate piece 75a. In the first embodiment, the second collapsing portion 76 is not provided in the impact absorbing slot 74 of the first suspending planar portion 71 (see FIG. 2A, FIGS. 3A to 3D, and FIG. 5). That is, the upper side 74a and the lower side 74b of the impact absorbing slot 74 of the first suspending planar portion 71 are parallel to the axial direction of the column pipe 6.

Immediately after the bolt shaft 51 presses down the first collapsing portion 75 configured as the protruding plate piece 75a, of the first suspending planar portion 71 in the event of a secondary collision, the bolt shaft 51 reaches the starting end of the second collapsing portion 76 configured as the inclined side. Simultaneously with the bolt shaft 51 pressing down the first collapsing portion 75 configured as the protruding plate piece 75a and the bolt shaft 51 entering into the region of the impact absorbing slot 74, the bolt shaft 51 comes into contact with the second collapsing portion 76 configured as the inclined side and moves in relation to the second collapsing portion 76 while pressing the second collapsing portion 76.

The height dimension of the second suspending planar portion 72 near the starting end of the impact absorbing slot 74 is larger than the height dimension of the telescopic slot 73 due to the step 74c. Furthermore, the dimension of the second suspending planar portion 72 in the height direction of the impact absorbing slot 74 is the smallest at the rear-side end of the second collapsing portion 76 configured as the inclined side. The height dimension of the second suspending planar portion 72 at the trailing end on the rear side of the impact absorbing slot 74 is larger than the diameter of the bolt shaft 51.

That is, in the event of a secondary collision, the bolt shaft 51 comes into contact with the second collapsing portion 76 only configured as the inclined side formed on the upper side 74a in the impact absorbing slot 74 of the second suspending planar portion 72 and does not come into contact with the lower side 74b (see FIGS. 4A to 4D). Furthermore, the bolt shaft 51 does not come into contact with the lower side 74b in the impact absorbing slot 74 of the first suspending planar portion 71.

Due to this, the bolt shaft 51 is separated from the lower side 74b of the impact absorbing slot 74 of each of the first and second suspending planar portions 71 and 72 so as not to come into contact with the lower side 74b, and the bolt shaft 51 can make contact with only the second collapsing portion 76. Therefore, the bolt shaft 51 can generate only a load that crushes the second collapsing portion 76, and it is easy to set the latter-half load after the first collapsing portion 75 collapses.

In the first embodiment, the step 74c of the second suspending planar portion 72 is formed in the lower side 74b of the impact absorbing slot 74, and the lower side 74b is located at a position further lower than the lower side 73b of the telescopic slot 73 (see FIG. 2D, FIGS. 4A to 4D, and FIG. 5). Furthermore, the step 74c of the second suspending planar portion 72 is formed closer to the rear side of the vehicle body than the step 74c of the first suspending planar portion 71 and is formed at a position close to the first collapsing portion 75 (see FIGS. 2D to 2F).

The step 74c of the second suspending planar portion 72 is provided on a side on the opposite side in the height direction from the side (the upper side 74a or the lower side 74b) of the impact absorbing slot 74 on which the second collapsing portion 76 is formed. Furthermore, the step 74c is formed at a position close to the first collapsing portion 75. In the first embodiment, since the second collapsing portion 76 is formed in the upper side 74a of the impact absorbing slot 74 of the second suspending planar portion 72, the step 74c is formed on the lower side 74b (see FIGS. 4A to 4D and FIG. 5).

The step 74c is a stair-shaped portion that makes the lower side 73b of the telescopic slot 73 and the lower side 74b of the impact absorbing slot 74 continuous in the second suspending planar portion 72. The lower side 74b of the impact absorbing slot 74 is positioned on the lower side in relation to the lower side 73b of the telescopic slot 73 with the step 74c interposed therebetween. That is, the step 74c forms a height difference corresponding to the height dimension m between the lower side 73b of the telescopic slot 73 and the lower side 74b of the impact absorbing slot 74 (see FIG. 4A).

Since the lower side 74b of the impact absorbing slot 74 is positioned on the lower side than the lower side 73b of the telescopic slot 73 due to the step 74c, the height dimension of the impact absorbing slot 74 of the second suspending planar portion 72 is larger than the height dimension of the telescopic slot 73. Furthermore, the height dimension of the impact absorbing slot 74 of the second suspending planar portion 72 is larger than the diameter of the bolt shaft 51 so that the bolt shaft 51 can be inserted into the impact absorbing slot 74.

Therefore, when the bolt shaft 51 moves inside the impact absorbing slot 74 of the second suspending planar portion 72 in relation to the impact absorbing slot 74, at least the bolt shaft 51 does not come into contact with the lower side 74b of the impact absorbing slot 74. Moreover, as described above, the bolt shaft 51 does not come into contact with the lower side 74b of the impact absorbing slot 74 of the first suspending planar portion 71. Due to this, when the bolt shaft 51 crushes the second collapsing portion 76 configured as the inclined side, of the second suspending planar portion 72, the bolt shaft 51 does not come into contact with the lower side 74b of the impact absorbing slot 74, and a desired energy absorbing load can be obtained in the event of a secondary collision.

The upper ends of the first and second suspending planar portions 71 and 72 are secured by welding or the like on the lower side in the radial direction of the column pipe 6. Due to this, when the second collapsing portion 76 formed on the upper side 74a of the impact absorbing slot 74 of the second suspending planar portion 72 is crushed by the bolt shaft 51 in the event of a secondary collision, the deformation of the stopper bracket 7 is suppressed. Therefore, the bolt shaft 51 can generate only the load that crushes the second collapsing portion 76, and it is easy to set the latter-half load after the first collapsing portion 75 collapses.

Figure 5:
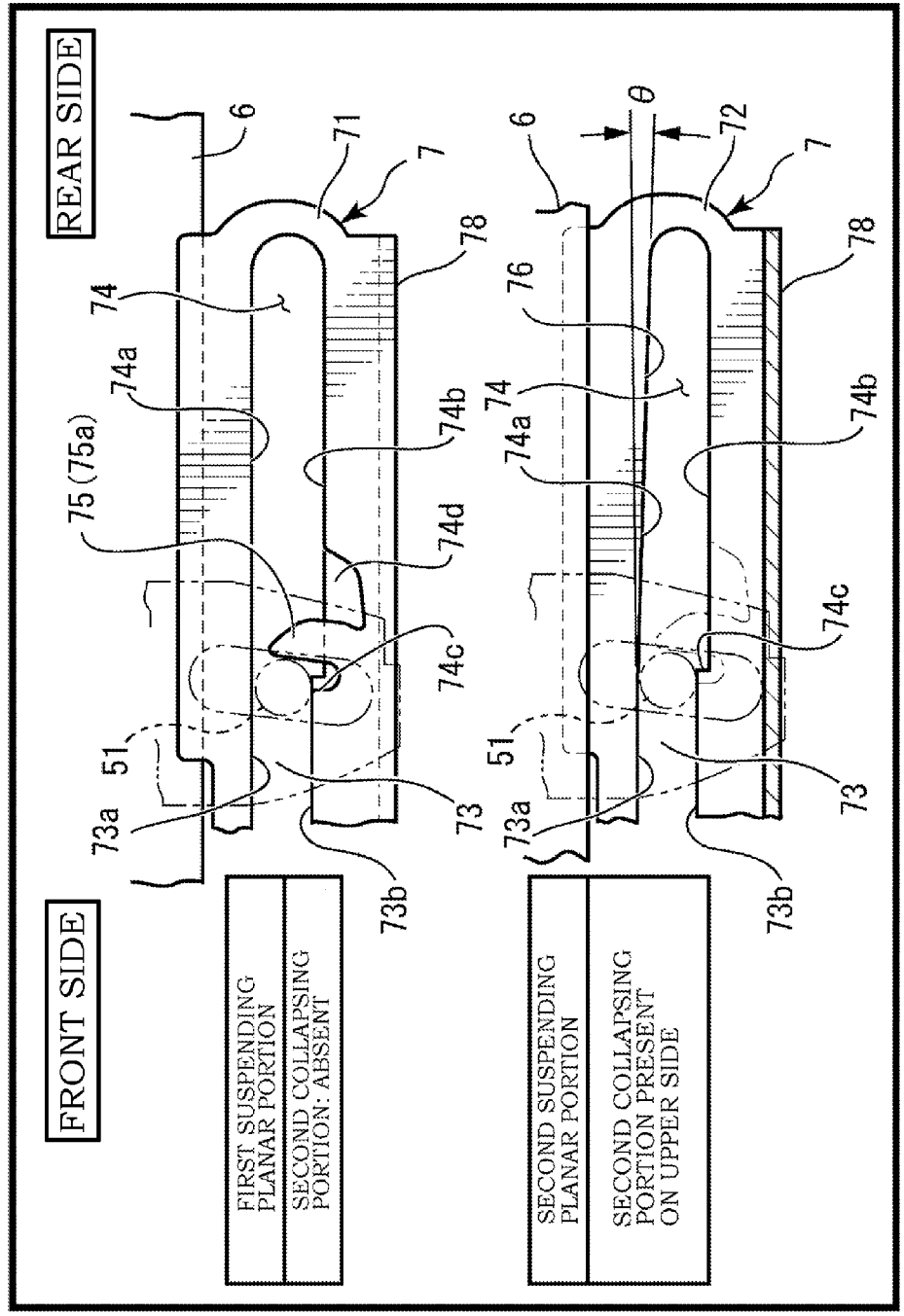
FIG. 5 is an enlarged view of main parts of a stopper bracket, illustrating a configuration of a first embodiment of the second collapsing portion.

The position of the step 74c of the second suspending planar portion 72 is located closer to the rear side than the step 74c of the first suspending planar portion 71, in other words, the position of the front-side end of the first collapsing portion 75 (see FIGS. 2E and 2F and FIG. 5). Here, the position of the step 74c of the second suspending planar portion 72 is determined based on a contact point P at which the bolt shaft 51 comes into contact with the first collapsing portion 75. In FIG. 2E, the distance between the position of the contact point P and the step 74c is n1.

In FIG. 2F, the distance between the position of the contact point P and the step 74c is n2. The distance n1 is larger than the distance n2. That is, since the distance between the position of the contact point P and the step 74c is n2, the step 74c is very close to the first collapsing portion 75. When the distance between the position of the step 74c and the position of the contact point P is as large as n1, the bolt shaft 51 enters into the region of the impact absorbing slot 74 while crushing the first collapsing portion 75 and a secondary impact absorbing operation is performed. When the distance between the position of the step 74c and the position of the contact point P is as small as n2, the bolt shaft 51 remains in the region of the telescopic slot 73 until immediately after the bolt shaft 51 comes into contact with the first collapsing portion 75 to press down and crush the first collapsing portion 75.

That is, both distances n1 and n2 are maintained in the same plane as the lower side 73b of the telescopic slot 73 until the bolt shaft 51 comes into contact with the first collapsing portion 75 configured as the protruding plate piece 75a. Even immediately after an impact of a secondary collision, the bolt shaft 51 is supported by the telescopic slots 73 of the first and second suspending planar portions 71 and 72. Thus, it is possible to prevent the bolt shaft 51 from being tilted in the axial direction and to stabilize an operation of the bolt shaft 51 pressing down the first collapsing portion 75. Due to this, it is possible to maintain an appropriate impact absorbing operation against a secondary collision.

The upper side 73a of the telescopic slot 73 of the first suspending planar portion 71 and the upper side 74a of the impact absorbing slot 74 are aligned on a straight line. Therefore, the bolt shaft 51 can smoothly move from the telescopic slot 73 toward the impact absorbing slot 74 in the event of a secondary collision. Moreover, the bolt shaft 51 can be guided so as to press down the second collapsing portion 76 configured as the inclined side formed on the impact absorbing slot 74 of the second suspending planar portion 72.

Next, assembly of main constituent members of the present invention will be described. The column pipe 6 is grasped by the grasping inner circumferential surface 1a of the grasping portion 1 of the outer column A. The stopper bracket 7 secured to the column pipe 6 is disposed between both the clamping portions 2 of the outer column A. Both the clamping portions 2 of the outer column A are sandwiched between both the fixed side portions 41 of the fixed bracket 4. The bolt shaft 51 of the clamping tool 5 passes through the adjustment holes 43 of both the fixed side portions 41, both clamping through-holes 22 formed in both the clamping portions 2, and the telescopic slot 73 of the stopper bracket 7 and is attached by the nut 54 together with the locking lever portion 52 and the clamping cam 53 (see FIGS. 1A to 1C).

When the locking lever portion 52 is turned, the clamping portions 2 are pressed and both the clamping cam 53 and the clamping portions 2 are clamped by the clamping tool 5. As a result, the interval of the slit 11 of the grasping portion 1 of the outer column A decreases and the column pipe 6 attached to the outer column A is locked (fixed) in the axial direction.

The stopper bracket 7 is disposed between both the clamping portions 2 of the outer column A. When the outer column A is clamped by the clamping tool 5, both the clamping portions 2 approach each other but the stopper bracket 7 is separated from both the clamping portions 2 (see FIGS. 3B and 3C). Therefore, since no friction is generated between the stopper bracket 7 and both the clamping portions 2 of the outer column A when the lever is clamped, it is easy to design (set) an optimal energy absorbing load.

Next, the operation in the event of a secondary collision will be described. In the event of a secondary collision, first, the first collapsing portion 75 configured as the protruding plate piece 75a provided in the impact absorbing slot 74 of the first suspending planar portion 71 is pressed down by the bolt shaft 51 of the clamping tool 5, and a first peak load of the secondary collision is generated (see FIGS. 3A to 3C). Subsequently, the bolt shaft 51 presses down the first collapsing portion 75 and moves from the telescopic slot 73 toward the impact absorbing slot 74 (see FIG. 3D).

The second collapsing portion 76 configured as the inclined side is provided on the upper side 74a of the impact absorbing slot 74 of the second suspending planar portion 72. The bolt shaft 51 comes into contact with the second collapsing portion 76 and moves toward the rear side in relation to the second collapsing portion 76 while pressing or squeezing the second collapsing portion 76 (see FIGS. 4A to 4D). When the second collapsing portion 76 is pressed or squeezed by the bolt shaft 51, it is possible to gradually increase the latter-half load after the peak load is generated. In this manner, it is possible to absorb energy individually with the first and second collapsing portions 75 and 76 at different time and to set an appropriate energy absorbing load.

In general telescopic adjustment, the first and second suspending planar portions 71 and 72 on both sides in the width direction of the stopper bracket 7 maintain a separated state without making contact with both clamping portions 2 of the outer column A. As a result, the frictional force is not applied from the fixed bracket 4 and the outer column A to the stopper bracket 7.

Due to this, the load when the first collapsing portion 75 is crushed by the bolt shaft 51, the load when the second collapsing portion 76 is crushed, and a frictional load based on the telescopic holding force can be set individually. In addition to the frictional load, the load when the first collapsing portion 75 is pressed down by the bolt shaft and the squeezing load of the second collapsing portion 76 can be set individually. Thus, it is easy to design (set) an appropriate energy absorbing load.

When the bolt shaft 51 crushes the second collapsing portion 76 configured as the inclined side provided in the impact absorbing slot 74 of the second suspending planar portion 72, a downward load is applied to the bolt shaft 51 by the reaction force from the second collapsing portion 76 configured as the inclined side. Here, the lower sides 74b of the impact absorbing slots 74 of the first and second suspending planar portions 71 and 72 are formed to be lower than the lower side 73b of the telescopic slot 73 and the impact absorbing slots 74 have a large height dimension. Therefore, the bolt shaft 51 does not come into contact with the lower sides 74b of the impact absorbing slots 74 in the event of a secondary collision. Therefore, the bolt shaft 51 can generate only a load that crushes the second collapsing portion 76 and a desired energy absorbing load can be obtained.

Figure 6:
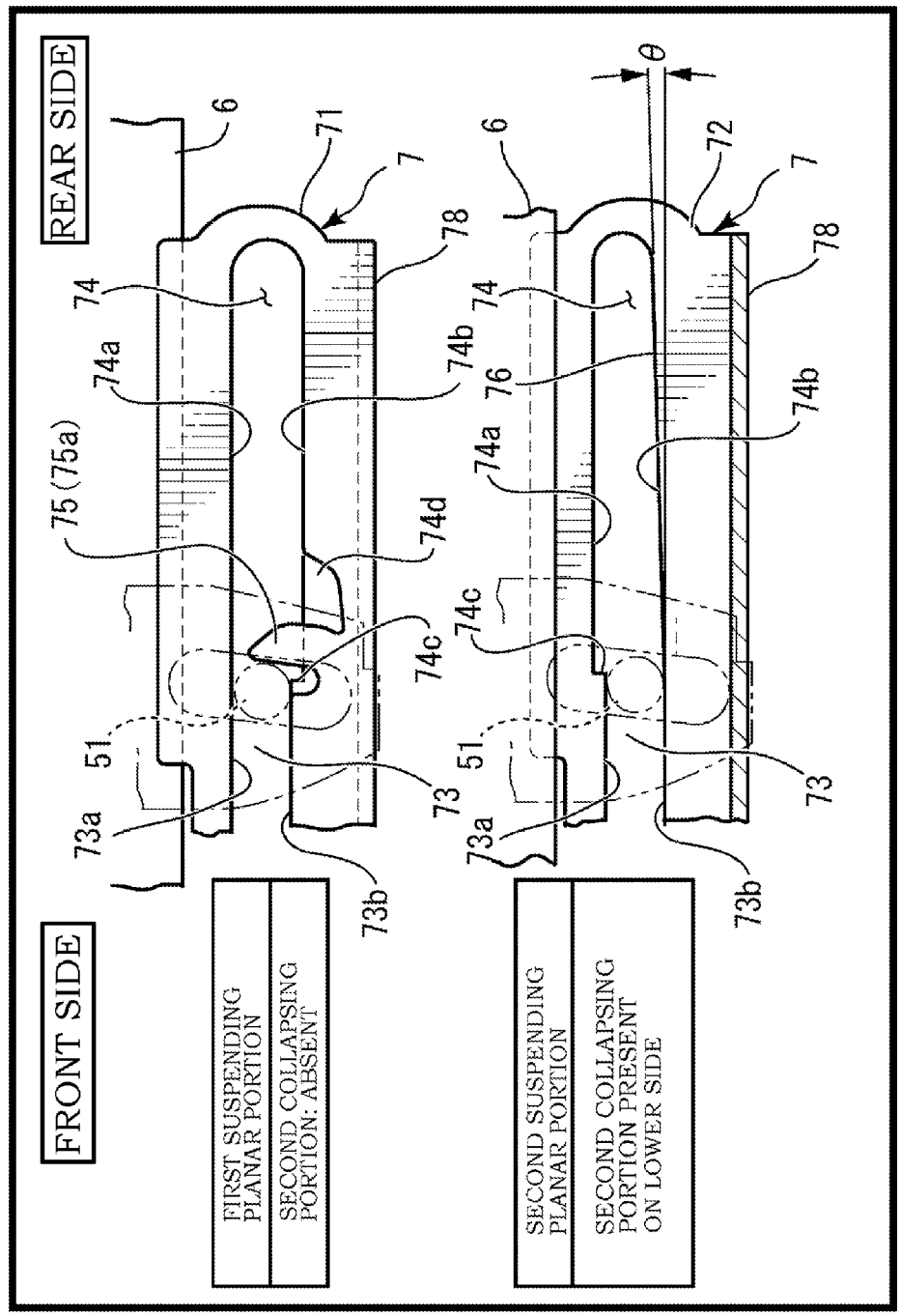
FIG. 6 is an enlarged view of main parts of a stopper bracket, illustrating a configuration of a second embodiment of the second collapsing portion.

Next, the second embodiment of the configuration of the second collapsing portion 76 will be described with reference to FIG. 6. In the second embodiment, the second collapsing portion 76 is formed on the lower side 74b of the impact absorbing slot 74 of the second suspending planar portion 72 (see FIG. 6). The second collapsing portion 76 is formed as such an inclined side that the height dimension of the impact absorbing slot 74 gradually decreases (narrows) from the starting end toward the trailing end (from the front side toward the rear side) of the lower side 74b of the impact absorbing slot 74.

Specifically, the second collapsing portion 76 configured as an inclined side is inclined upward by an angle θ about a reference straight line extending in the axial direction of the column pipe 6 on the lower side 74b. That is, the second collapsing portion 76 is formed in an upwardly inclined form from the starting end toward the trailing end (from the front side to the rear side) of the lower side 74b of the impact absorbing slot 74, and the trailing end of the lower side 74b approaches the upper side 74a (see FIG. 6). In the second embodiment, similarly to the first embodiment, the second collapsing portion 76 is not formed on the impact absorbing slot 74 of the first suspending planar portion 71.

As explained in the above, the step 74c of the second suspending planar portion 72 is provided on a side on the opposite side in the height direction of the side (the upper side 74a or the lower side 74b) of the impact absorbing slot 74 on which the second collapsing portion 76 is formed. In the second embodiment, the step 74c of the second suspending planar portion 72 is formed on the upper side 74a (see FIG. 6). Due to this, when the bolt shaft 51 moves inside the impact absorbing slot 74 of the second suspending planar portion 72 in relation to the impact absorbing slot 74, the bolt shaft 51 does not come into contact with the upper side 74a of the impact absorbing slot 74 of the second suspending planar portion 72.

Therefore, it is possible to set the latter-half load by setting the load when the bolt shaft 51 crushes the second collapsing portion 76 configured as the inclined side of the second suspending planar portion 72 and to obtain an appropriate energy absorbing load. Moreover, since the second collapsing portion 76 configured as the inclined side is formed on the lower side 74b of the impact absorbing slot 74, a deformation load is applied to the stopper bracket 7 so that the stopper bracket 7 is deformed downward. Therefore, it is possible to generate a larger energy absorbing load.

Figure 7:
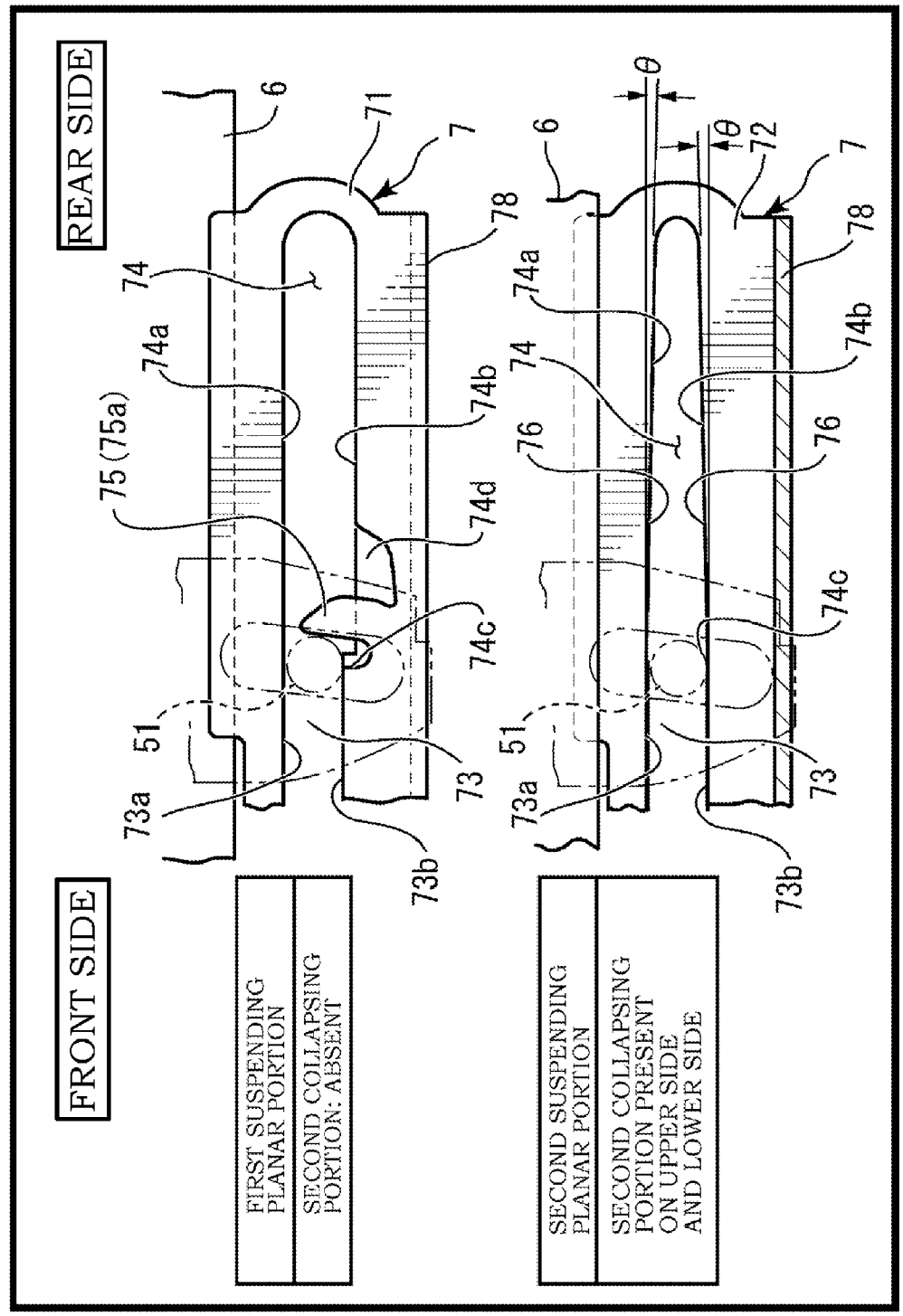
FIG. 7 is an enlarged view of main parts of a stopper bracket, illustrating a configuration of a third embodiment of the second collapsing portion.

Next, the third embodiment of the configuration of the second collapsing portion 76 will be described with reference to FIG. 7. In the third embodiment, the second collapsing portion 76 is formed on both the upper side 74a and the lower side 74b of the impact absorbing slot 74 of the second suspending planar portion 72 (see FIG. 7). The second collapsing portion 76 is formed as such an inclined side that the height dimension of the impact absorbing slot 74 gradually decreases (narrows) from the starting end toward the trailing end (from the front side toward the rear side) of each of the upper side 74a and the lower side 74b of the impact absorbing slot 74. Specifically, the second collapsing portion 76 configured as the inclined side is inclined downward and upward by an angle θ about a reference straight line extending in the axial direction of the column pipe 6 on the upper side 74a and the lower side 74b.

That is, the second collapsing portion 76 is formed in a downwardly inclined form from the starting end toward the trailing end (from the front side toward the rear side) of the upper side 74a of the impact absorbing slot 74. Moreover, the second collapsing portion 76 is formed in an upwardly inclined form from the starting end toward the trailing end (from the front side toward the rear side) of the lower side 74*b*. Furthermore, the trailing end of the lower side 74*b* approaches the trailing end of the upper side 74*a* (see FIG. 7).

In the third embodiment, similarly to the first embodiment, the second collapsing portion 76 is not provided on the impact absorbing slot 74 of the first suspending planar portion 71. Moreover, the step 74*c* is not provided on the second suspending planar portion 72. The second collapsing portion 76 configured as the inclined side is provided on both the upper side 74*a* and the lower side 74*b* of the impact absorbing slot 74. Therefore, it is possible to generate a larger energy absorbing load.

Figure 8:
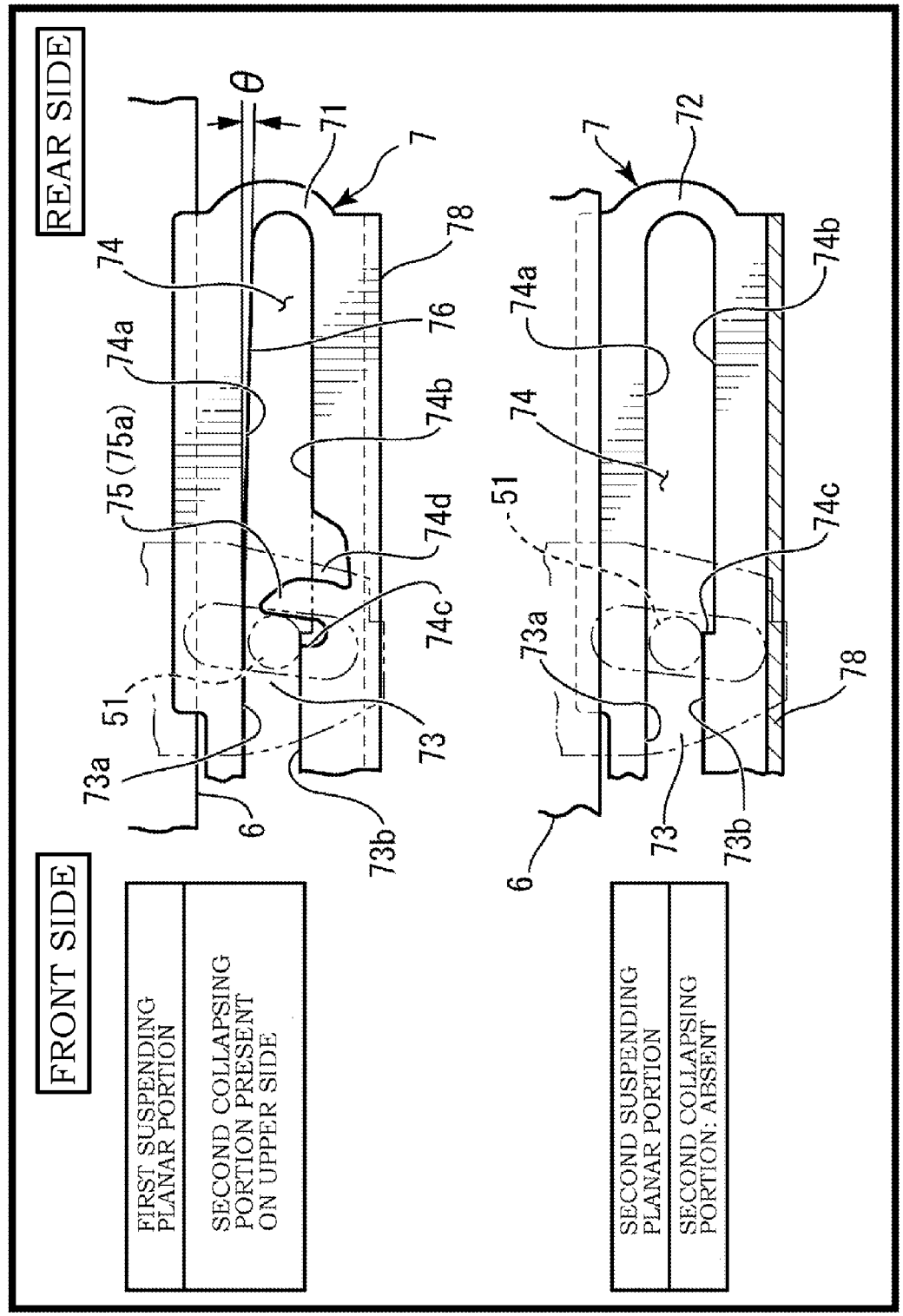
FIG. 8 is an enlarged view of main parts of a stopper bracket, illustrating a configuration of a fourth embodiment of the second collapsing portion.

Next, the fourth embodiment of the configuration of the second collapsing portion 76 will be described with reference to FIG. 8. In the fourth embodiment, the second collapsing portion 76 is formed on the upper side 74*a* of the impact absorbing slot 74 of the first suspending planar portion 71 (see FIG. 8). In the fourth embodiment, the second collapsing portion 76 formed on the impact absorbing slot 74 of the second suspending planar portion 72 of the first embodiment is applied to the impact absorbing slot 74 of the first suspending planar portion 71.

Specifically, the second collapsing portion 76 of the first suspending planar portion 71 is formed as such an inclined side that the height dimension of the impact absorbing slot 74 gradually decreases (narrows) from the starting end toward the trailing end (from the front side toward the rear side) of the upper side 74*a* of the impact absorbing slot 74. In the fourth embodiment, the second collapsing portion 76 is not provided on the impact absorbing slot 74 of the second suspending planar portion 72 (see FIGS. 8 to 10).

That is, the upper side 74*a* and the lower side 74*b* of the impact absorbing slot 74 of the second suspending planar portion 72 are parallel to the axial direction of the column pipe 6. Furthermore, the first collapsing portion 75 is provided on the first suspending planar portion 71, and the first collapsing portion 75 is not provided on the second suspending planar portion 72. Moreover, in the fourth embodiment, the step 74*c* of the second suspending planar portion 72 is formed on the lower side 74*b*.

Figure 9:
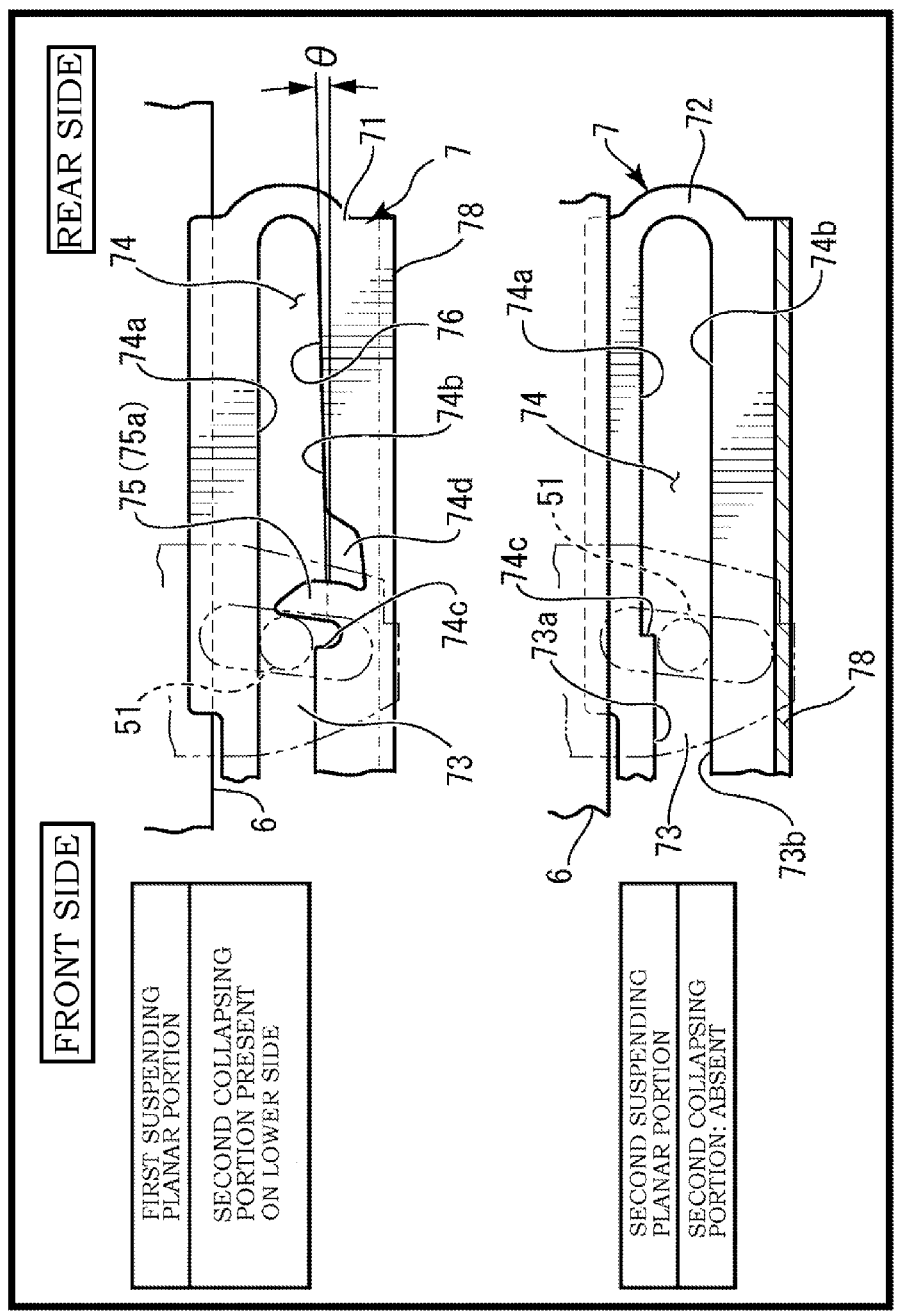
FIG. 9 is an enlarged view of main parts of a stopper bracket, illustrating a configuration of a fifth embodiment of the second collapsing portion.

Next, the fifth embodiment of the configuration of the second collapsing portion 76 will be described with reference to FIG. 9. In the fifth embodiment, the second collapsing portion 76 is formed on the lower side 74*b* of the impact absorbing slot 74 of the first suspending planar portion 71 (see FIG. 9). In the fifth embodiment, the second collapsing portion 76 formed on the impact absorbing slot 74 of the second suspending planar portion 72 of the second embodiment is applied to the impact absorbing slot 74 of the first suspending planar portion 71.

In the fifth embodiment, similarly to the fourth embodiment, the second collapsing portion 76 is not provided on the impact absorbing slot 74 of the second suspending planar portion 72. Furthermore, the first collapsing portion 75 is provided on the first suspending planar portion 71 and the first collapsing portion 75 is not provided on the second suspending planar portion 72. Moreover, in the fifth embodiment, the step 74*c* of the second suspending planar portion 72 is formed on the upper side 74*a*.

Figure 10:
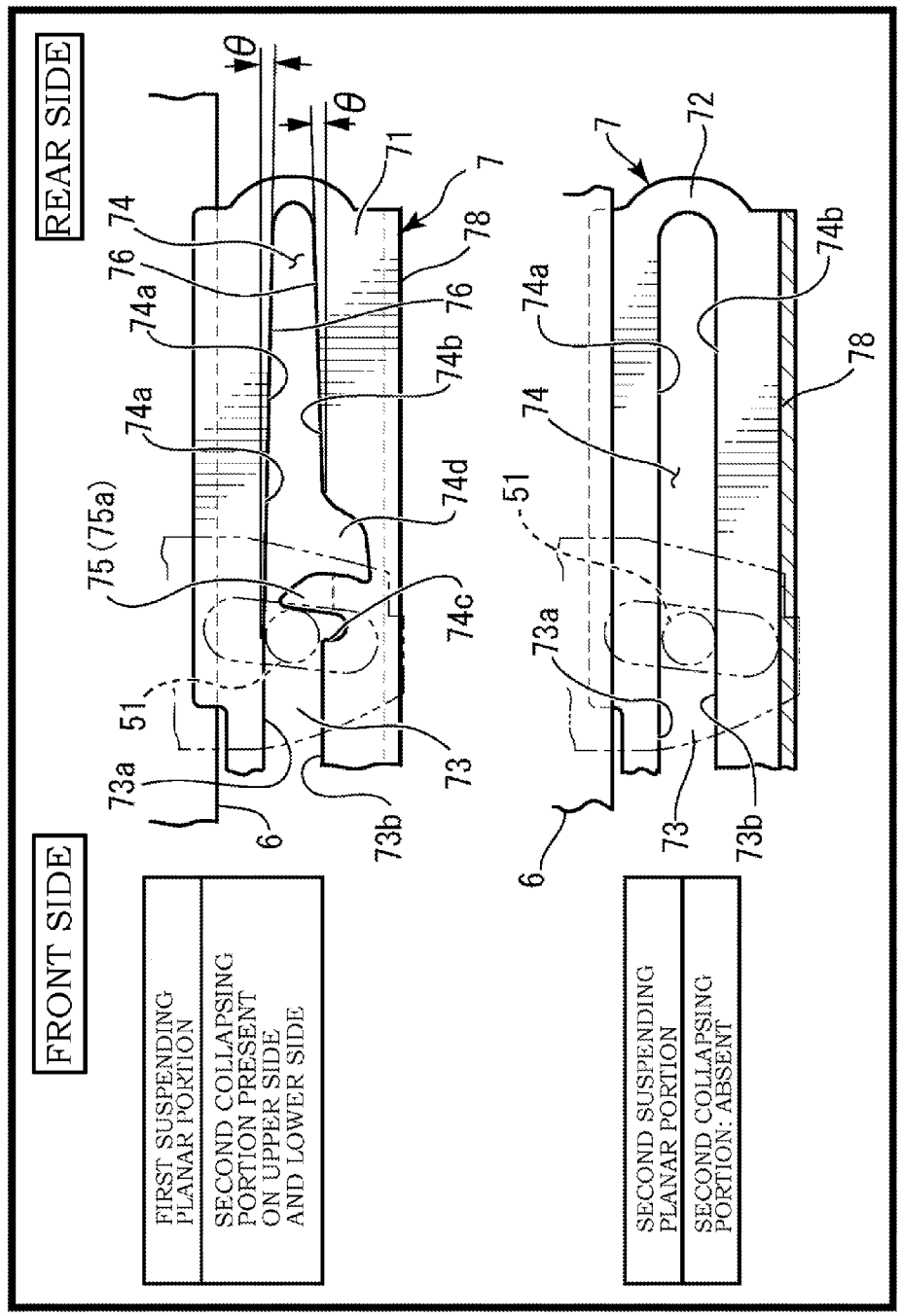
FIG. 10 is an enlarged view of main parts of a stopper bracket, illustrating a configuration of a sixth embodiment of the second collapsing portion.

Next, the sixth embodiment of the configuration of the second collapsing portion 76 will be described with reference to FIG. 10. In the sixth embodiment, the second collapsing portion 76 is formed on both the upper side 74*a* and the lower side 74*b* of the impact absorbing slot 74 of the first suspending planar portion 71 (see FIG. 10). In the sixth embodiment, the second collapsing portion 76 formed on the impact absorbing slot 74 of the second suspending planar portion 72 of the third embodiment is applied to the impact absorbing slot 74 of the first suspending planar portion 71.

In the sixth embodiment, similarly to the fourth and fifth embodiments, the second collapsing portion 76 is not provided on the impact absorbing slot 74 of the second suspending planar portion 72. Furthermore, the first collapsing portion 75 is provided on the first suspending planar portion 71 and the first collapsing portion 75 is not provided on the second suspending planar portion 72. Moreover, in the sixth embodiment, the step 74*c* is not provided on the second suspending planar portion 72.

Hereinabove, the first to sixth embodiments have been described as the embodiments of the second collapsing portion 76. In any embodiment, it is possible to gradually increase the latter-half load after the first collapsing portion 75 is crushed by the bolt shaft 51 and to easily set the latter-half load.

In the description of the first to sixth embodiments, the left side of the stopper bracket 7 when seen from the rear side of the vehicle body is defined as the first suspending planar portion 71 and the right side is defined as the second suspending planar portion 72. However, the present invention is not necessarily limited to this, but the right side of the stopper bracket 7 when seen from the rear side may be set as the first suspending planar portion 71 and the left side may be set as the second suspending planar portion 72. In this case, the same effects can be obtained.

In the second and fifth embodiments, since the second collapsing portion configured as the inclined side is provided on the upper side of the impact absorbing slot, the upper side of the stopper bracket is secured to the column pipe. Therefore, the deformation of the stopper bracket is suppressed by the column pipe, and the bolt shaft can press the second collapsing portion intensively. As a result, the second collapsing portion is easily deformed by absorbing an impact and the energy is absorbed satisfactorily.

In the third and sixth embodiments, since the second collapsing portion configured as the inclined side is provided on the lower side of the impact absorbing slot, a downward deformation load of the stopper bracket is applied and larger energy can be absorbed. In the fourth and seventh embodiments, since the second collapsing portion configured as the inclined side is provided on both the upper side and the lower side of the impact absorbing slot, still larger energy can be absorbed.

In the eighth embodiment, since the height dimension of the impact absorbing slot is larger than the height dimension of the telescopic slot due to the step, the bolt shaft comes into contact with the inclined side on which the second collapsing portion is provided inside the impact absorbing slot and rarely comes into contact with the other side. Therefore, the bolt shaft can generate only a load that crushes the second collapsing portion and a desired energy absorbing load can be obtained. Furthermore, the position of the step in the first suspending planar portion and the position of the step in the second suspending planar portion are shifted from each other in the front-rear direction.

The step is formed near the first collapsing portion between the telescopic slot and the impact absorbing slot and the steps of the first and second suspending planar portions are formed at different positions in the axial direction. Therefore, the bolt shaft maintains a stable state until the bolt shaft finishes bending the first collapsing portion configured as the protruding plate piece. As a result, it is possible to prevent the bolt shaft from falling into the impact absorbing slot while the first collapsing portion is being bent and prevent the first collapsing portion from being bent incompletely, thereby reliably crushing the first collapsing portion.

In the ninth embodiment, the protruding plate piece of the first collapsing portion is formed to be inclined upward and downward from the lower side of the impact absorbing slot. Therefore, the first collapsing portion is smoothly crushed by the bolt shaft in the event of a secondary collision and it is possible to obtain a satisfactory energy absorbing load in the event of a secondary collision.

What is claimed is:

1. A steering apparatus comprising:
   a column pipe;
   an outer column having a grasping portion that grasps the column pipe and clamping portions that allow the grasping portion to extend and contract in a radial direction;
   a fixed bracket having a fixed side portion that sandwiches both sides of the outer column in a width direction;
   a stopper bracket secured to the column pipe and disposed between both of the clamping portions; and
   a clamping tool having a bolt shaft that clamps and unclamps both of the clamping portions of the outer column, the stopper bracket, and the fixed bracket, the stopper bracket being configured to be separated from both of the clamping portions when the outer column is clamped by the clamping tool, wherein
   the stopper bracket has in the width direction thereof a first suspending planar portion and a second suspending planar portion on both sides,
   on the first and second suspending planar portions,
   a telescopic slot and an impact absorbing slot, in which the bolt shaft can be inserted, are formed extending from a front side toward a rear side in the first and second suspending planar portions,
   a first collapsing portion which is configured as a protruding plate piece positioned between the telescopic slot and the impact absorbing slot of the first suspending planar portion and bent when colliding with the bolt shaft in the event of a secondary collision is provided, and
   a second collapsing portion configured as an inclined side, the height dimension of which decreases toward a trailing end is provided in the impact absorbing slot of one of the first suspending planar portion and the second suspending planar portion.

2. The steering apparatus according to claim 1, wherein the second collapsing portion configured as the inclined side is formed on the upper side of the impact absorbing slot on the side of the second suspending planar portion.

3. The steering apparatus according to claim 1, wherein the second collapsing portion configured as the inclined side is formed on the lower side of the impact absorbing slot on the side of the second suspending planar portion.

4. The steering apparatus according to claim 1, wherein the second collapsing portion configured as the inclined side is formed on the upper side and the lower side of the impact absorbing slot on the side of the second suspending planar portion.

5. The steering apparatus according to claim 1, wherein the second collapsing portion configured as the inclined side is formed on the upper side of the impact absorbing slot on the side of the first suspending planar portion.

6. The steering apparatus according to claim 1, wherein the second collapsing portion configured as the inclined side is formed on the lower side of the impact absorbing slot on the side of the first suspending planar portion.

7. The steering apparatus according to claim 1, wherein the second collapsing portion configured as the inclined side is formed on the upper side and the lower side of the impact absorbing slot on the side of the first suspending planar portion.

8. The steering apparatus according to claim 1, wherein a step is formed near a starting end of each of both impact absorbing slots,
due to the step, a height dimension near the starting end of each of the impact absorbing slots is larger than a height dimension of each telescopic slot, and
positions of respective steps are shifted in a front-back direction.

9. The steering apparatus according to claim 1, wherein the protruding plate piece of the first collapsing portion is formed to be inclined upward and downward from a lower side of the impact absorbing slot.

* * * * *